United States Patent [19]
Kato et al.

[11] Patent Number: 6,078,989
[45] Date of Patent: Jun. 20, 2000

[54] DISC ARRAY CONTROL METHOD AND DISC ARRAY CONTROL APPARATUS

[75] Inventors: Yasunobu Kato, Kanagawa; Takashi Totsuka, Chiba; Hiroyuki Shioya, Tokyo, all of Japan

[73] Assignee: Sony Corporation, Tokyo, Japan

[21] Appl. No.: 08/938,738

[22] Filed: Sep. 26, 1997

[30] Foreign Application Priority Data

Oct. 4, 1996 [JP] Japan .................................. 8-264218

[51] Int. Cl.[7] .............................. G11B 20/12; G06F 11/00
[52] U.S. Cl. ............................ 711/114; 714/770; 714/805
[58] Field of Search ............................... 714/6, 769, 770, 714/5, 7, 801, 805; 711/114; 360/22–23

[56] References Cited

U.S. PATENT DOCUMENTS

| | | | |
|---|---|---|---|
| 5,072,378 | 12/1991 | Manka ......................................... | 714/6 |
| 5,301,310 | 4/1994 | Isman et al. ................................. | 714/5 |
| 5,459,853 | 10/1995 | Best et al. ................................. | 711/114 |
| 5,510,905 | 4/1996 | Birk ........................................ | 386/125 |
| 5,592,612 | 1/1997 | Birk ........................................... | 714/6 |
| 5,724,552 | 3/1998 | Taoda ....................................... | 711/114 |
| 5,737,745 | 4/1998 | Matsumoto et al. ..................... | 711/114 |
| 5,761,526 | 6/1998 | Sakakura et al. ........................ | 711/114 |
| 5,809,547 | 9/1998 | Taoda ....................................... | 711/114 |
| 5,915,094 | 6/1999 | Kouloheris et al. ..................... | 345/327 |

*Primary Examiner*—Eddie P. Chan
*Assistant Examiner*—Yamir Encarnación
*Attorney, Agent, or Firm*—Limbach & Limbach, LLP

[57] ABSTRACT

There is provided a disc array control method and apparatus for controlling access to a disc drive consisting of a plurality of second data obtained by dividing a first data and a plurality of discs for storing the error correction data for the second data. Particularly, the disc array control method and apparatus of the present invention determines the information consisting of disc storing a plurality of the second data and address on the disc, data size of a plurality of second data and disc storing the error correction data and address on the disc to make equal the time required for access to a plurality of second data and error correction data and executes the access to the disc drive on the basis of the determined information. Thereby, the time required for access to the error correction data and sub-blocks can be set to equal time and the real-time property can be assured while maintaining high reliability.

12 Claims, 21 Drawing Sheets

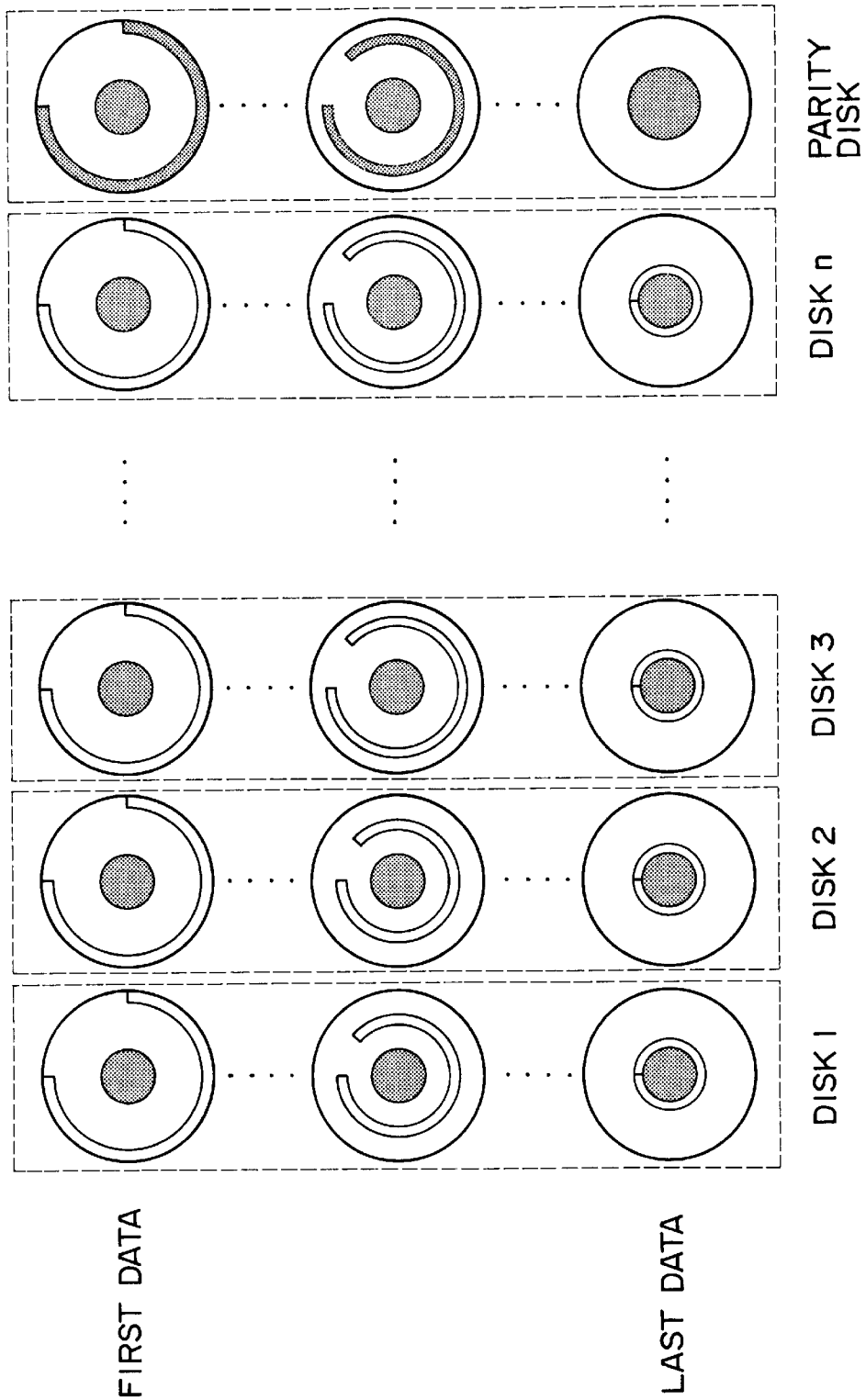

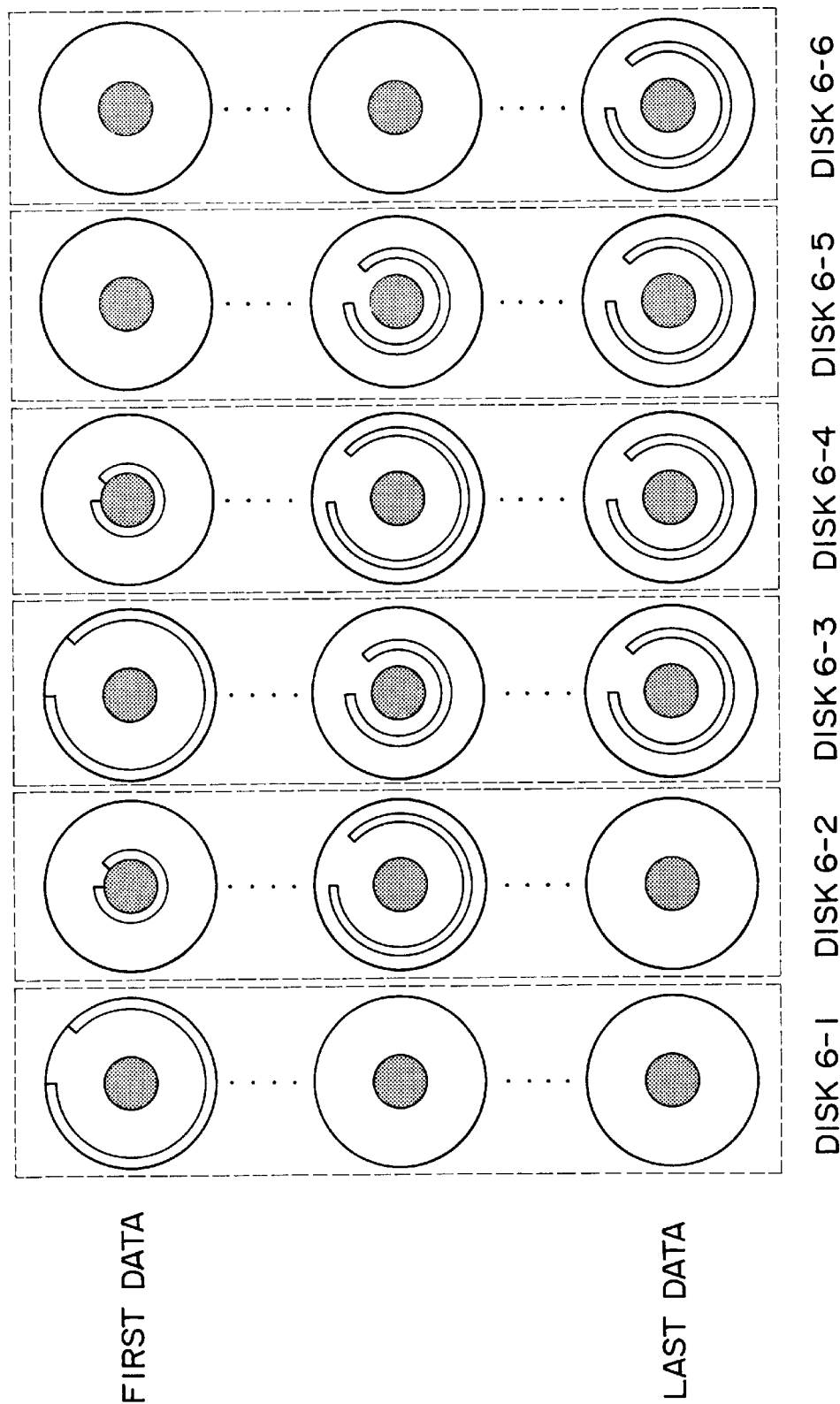

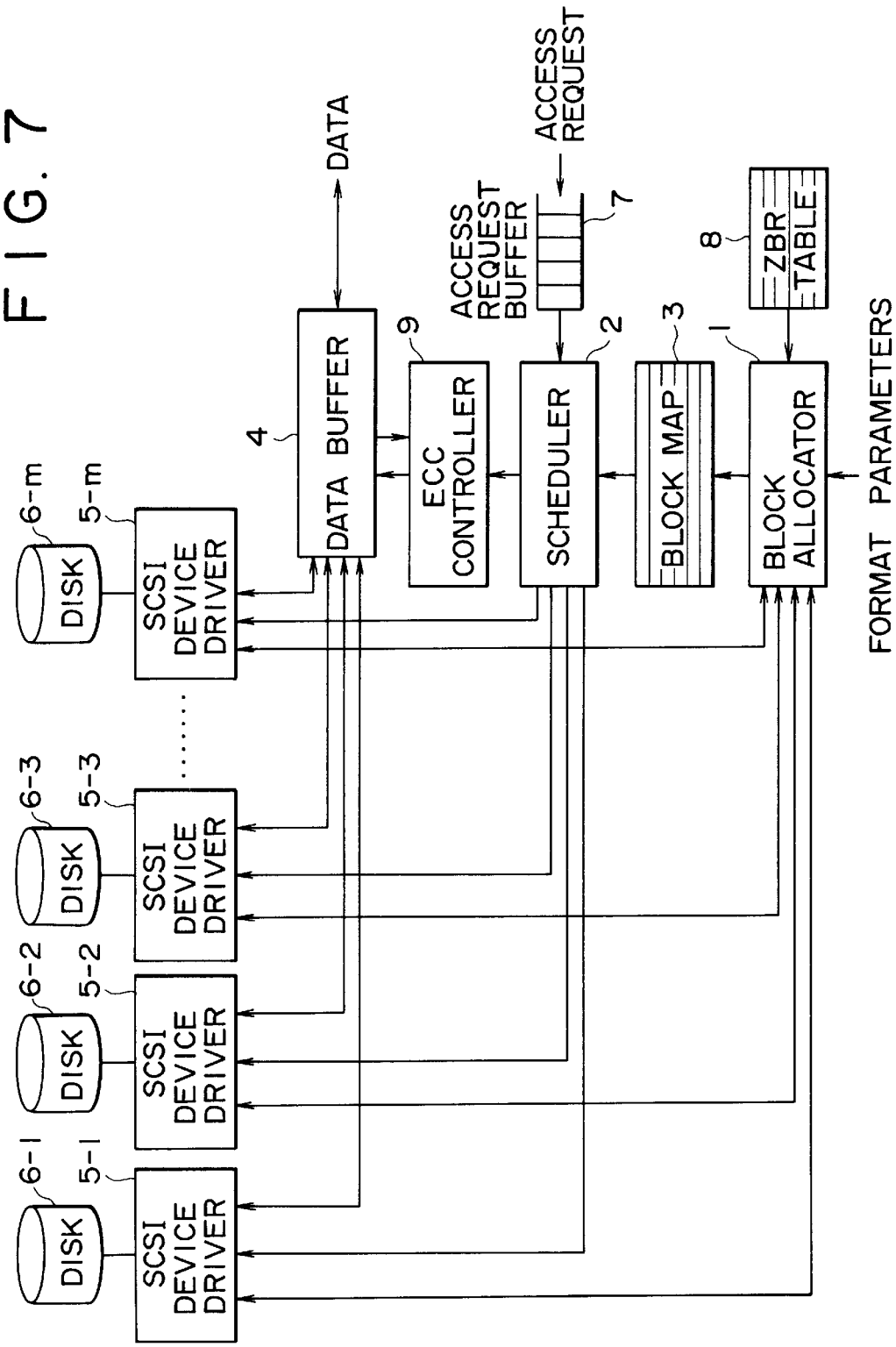

FIG. 8A

| DATA NO. | DISK ID | LOGICAL SECTOR | SIZE |
|---|---|---|---|
| k | P | $D_{k0}$ | $L_{k0}$ | $S_{k0}$ |
| | | $D_{k1}$ | $L_{k1}$ | $S_{k1}$ |
| | | $D_{k2}$ | $L_{k2}$ | $S_{k2}$ |
| | | .. | .. | .. |
| | | $D_{kn}$ | $L_{kn}$ | $S_{kn}$ |

FIG. 8B

| DATA NO. | DISK ID | LOGICAL SECTOR | SIZE |
|---|---|---|---|
| 1 | P | 1 | 0 | 200 |
| | | 2 | 19900 | 100 |
| | | 3 | 0 | 200 |
| | | 4 | 19900 | 100 |
| | | 5 | 0 | 200 |
| 2 | P | 2 | 0 | 200 |
| | | 3 | 19900 | 100 |
| | | 4 | 0 | 200 |
| | | 5 | 19900 | 100 |
| | | 6 | 0 | 200 |
| 3 | P | 3 | 200 | 198 |
| | | 4 | 19798 | 102 |
| | | 5 | 200 | 198 |
| | | 6 | 19898 | 102 |
| | | 1 | 200 | 198 |
| ... | | | | |

FIG. 11

| | | | | | | | | | |
|---|---|---|---|---|---|---|---|---|---|
| SUBBLOCK #1 | A0 | A1 | A2 | A3 | A4 | ... | $A_{n-1}$ | $A_n$ | |
| SUBBLOCK #2 | B0 | B1 | B2 | B3 | B4 | ... | $B_{n-1}$ | $B_n$ | $B_{n+1}$ $B_{n+2}$ $B_{n+3}$ ... $B_{r-2}$ $B_{r-1}$ $B_r$ |
| SUBBLOCK #3 | C0 | C1 | C2 | C3 | C4 | ... | $C_{n-1}$ | $C_n$ | |
| SUBBLOCK #4 | D0 | D1 | D2 | D3 | D4 | ... | $D_{n-1}$ | $D_n$ | $D_{n+1}$ $D_{n+2}$ $D_{n+3}$ ... $D_{r-2}$ $D_{r-1}$ $D_r$ |
| PARITY | P0 | P1 | P2 | P3 | P4 | ... | $P_{n-1}$ | $P_n$ | $P_{n+1}$ $P_{n+2}$ $P_{n+3}$ ... $P_{r-2}$ $P_{r-1}$ $P_r$ |

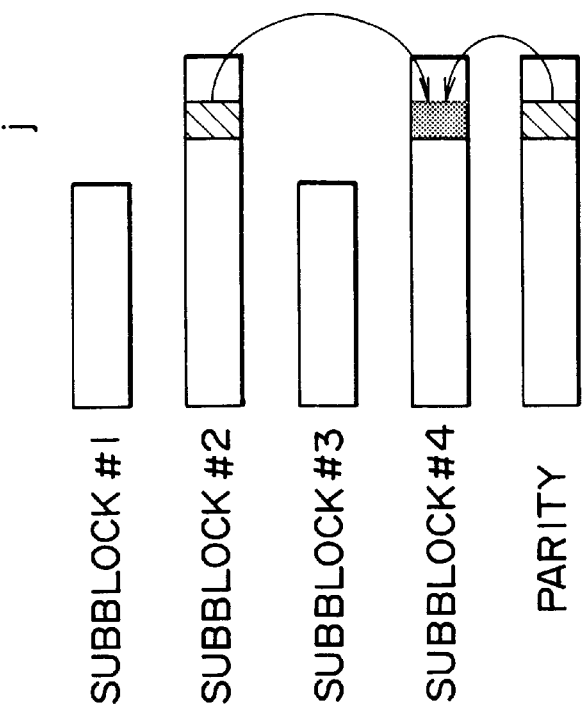
F I G. 12B
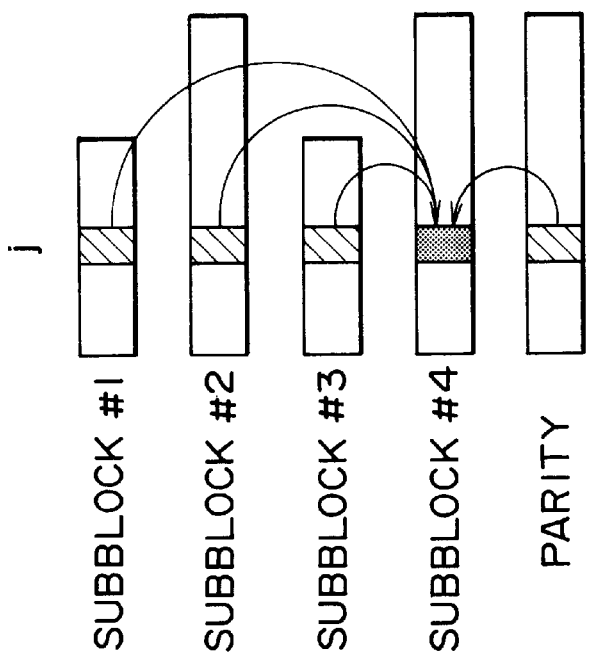
F I G. 12A

F I G. 14B

| LOGICAL SECTOR | CYLINDER | MEDIA | SECTOR |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 0 | 0 | 4 |
| 5 | 0 | 0 | 5 |
| 6 | 0 | 0 | 6 |
| 7 | 0 | 0 | 7 |
| ..... | ..... | ..... | ..... |

F I G. 14A

| LOGICAL SECTOR | CYLINDER | MEDIA | SECTOR |
|---|---|---|---|
| $L_{ki}$ | $CYL_{ki}$ | $MED_{ki}$ | $SEC_{ki}$ |

F I G. 15
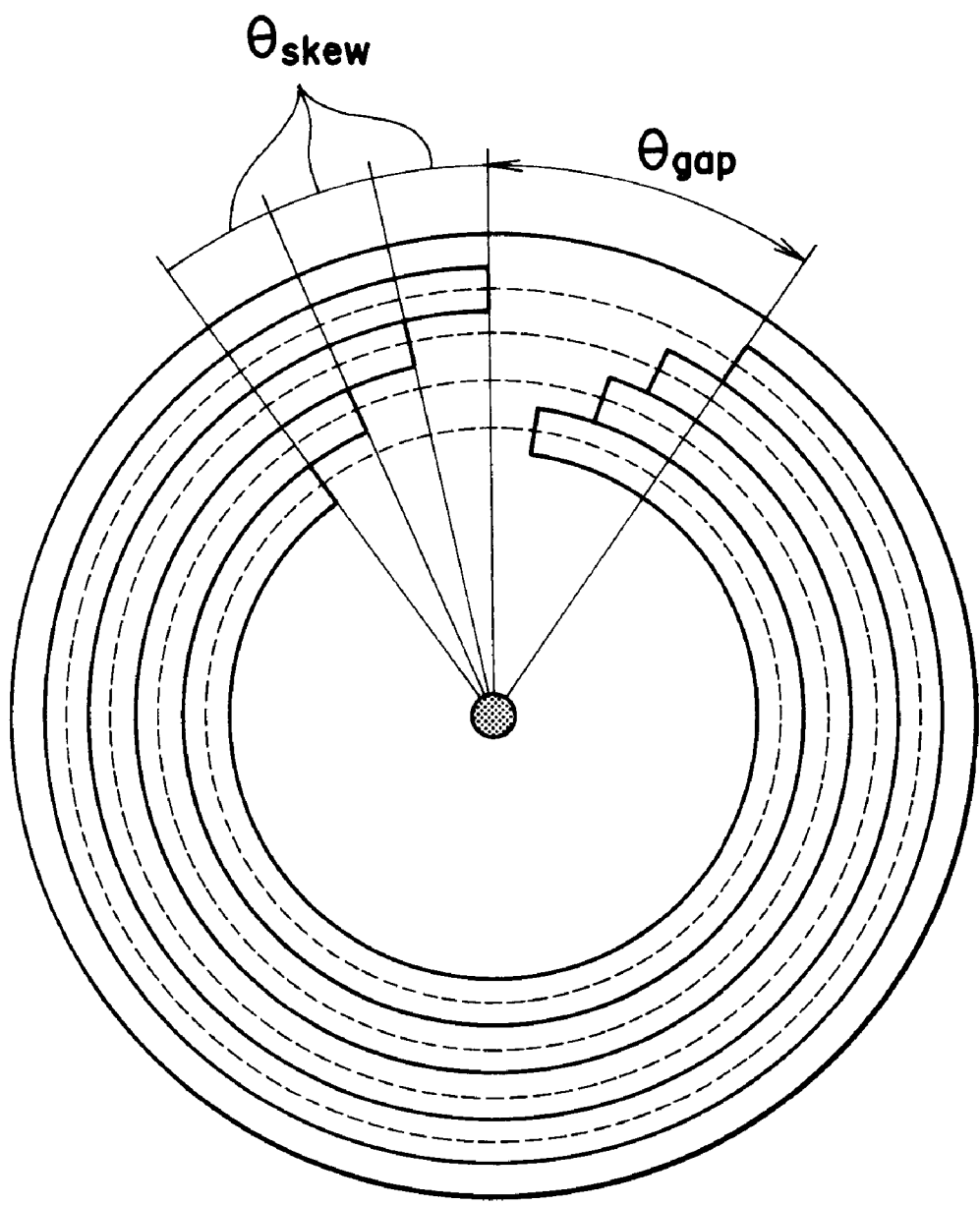

DISC ARRAY CONTROL METHOD AND DISC ARRAY CONTROL APPARATUS

BACKGROUND OF THE INVENTION

1. Field of the Invention

The present invention relates to a disc array control method and apparatus and more particularly to a disc array control method and apparatus which can keep constant the access time of the error correction data and sub-block by generating an error correction data from the sub-block.

2. Description of the Related Art

The computer systems have realized remarkable development in these years and such development requires more improved characteristics of an external memory device. In order to satisfy such requirement, a disc array apparatus has been developed. This disc array apparatus realizes large capacity by comprising a plurality of disc drives. In this case, each disc drive is operated in parallel to realize high speed access for reading and writing the data and also realize higher reliability by introducing error correction data.

In the case of storing data in the disc array apparatus, data is divided into a plurality of sub-blocks and an error correction data is generated from such sub-blocks and all sub-blocks and error correction data are written into individual disk drives.

On the contrary, in the case of reading data from a disc array apparatus, a plurality of sub-blocks and error correction data are read simultaneously from a plurality of sub-blocks from a disc drive storing sub-blocks constituting data and error correction data. The original data is constituted from the sub-blocks read out and if an error is not found, the data is transmitted in direct. In this case, if data cannot be read normally due to such a reason that the recording area storing the sub-blocks is broken, the correct data is recovered from the other sub-blocks read normally and error correction data and thereafter such data is transmitted.

Moreover, in the disc array apparatus, it is also possible to provide the function that even if one disc drive is perfectly broken, the broken disc drive is replaced with a new disc drive and the broken data is recovered using the data in the other disc drive.

For the disc array apparatus introducing the error correction data, several different systems are provided. Professor David A. Patterson (Berkeley School of UC) et. Al. have proposed to classify the system into five stages and use the term level of RAID (Redundant Arrays of Inexpensive Disks) first time. Contents of such proposal are briefly introduced herein.

The RAID-1 level is called the mirrored disc in which the data of the disc drive is duplicated. In the RAID-1 level, the exactly same data is stored in a couple of disc drives. In the RAID-2, 3 levels, an input data is divided in unit of bit or byte and stored in a plurality of disc drives. In the RAID-2 level, the Hamming code is used as the error correction data, while in the RAID-3 level, parity is used as the error correction data. In the RAID-4, 5 levels, the data is interleaved in unit of sector. In the RAID-4 level, parity is stored in the same disc drive, while in the RAID-5 level, parity is stored in a plurality of disc drives.

Of these RAID levels, the RAID-3 and RAID-5 levels are used most often in an ordinary disc array apparatus. FIG. 1 shows a structure of the example of the disc array apparatus of the RAID-3 system and FIG. 2 shows a structure of the example of the disc array apparatus of the RAID-5 system.

Namely, in the disc array apparatus of RAID-3 system shown in FIG. 1, the input data is divided in units of one byte and each data divided in unit of byte is stored into one of a plurality of disc drives. The parity as the error correction data is stored in a predetermined disc drive. Here, the parity $P_{1-4}$ for the data of No. 1 to No. 4 stored in a plurality of disc drives and the parity $P_{5-8}$ for the data of No. 5 to No. 8 are stored in the predetermined disc drive.

Moreover, in the disc array apparatus of RAID-5 system shown in FIG. 2, the input data is divided in units of one sector and these data are interleaved for dispersion to a plurality of disc drives. In this case, the data A, E, I are stored in the first disc drive, the data B, F, J in the next disc drive and the data C, G and the parity $P_{I-L}$ for the data I to L are stored in the next disc drive. Moreover, the data D, K and parity $P_{E-H}$ for the data E to H in the next disc and the parity $P_{A-D}$ for the data A to D and the data H, L are stored in the final disc drive.

On the other hand, owing to the development of computers in these years, it is possible now to deal with multi-media data represented by image and voice data. The storage for these multi-media data is sometimes called a multi-media server. Since the multi-media server is required to assure the larger memory capacity and higher transfer rate, the hardware system is often realized as the disc array apparatus. However, emphasis has been placed in the average performance of process in the computer server of the related art, but importance is placed in how control the worst value of the time required for completing the process in the multi-media server.

For example, in the case of moving image, movement is not natural if 30 images are not sequentially displayed within one second with a constant interval. Moreover, if capability of the disc drive is insufficient and voice data becomes shortage, the voice signal is intermitted to generate uncomfortable noise. Assurance for the upper limit that total processing may be done within such a time even in the worst case is called the assurance for real-time property. In the multi-media server, it is also important whether such real-time property can be assured or not.

Here, there is provided a format method called zone bit recording (ZBR) for the disc memory device such as hard disc. Under the condition that the recording density is constant and rotating speed of the disc is also constant, a larger number of sectors per track may be obtained in the external circumference rather than the internal circumference. In the format method ZBR, the recording surface is divided into a plurality of zones depending on the distance from the center of disc. A larger number of sectors per track is provided in the external zones rather than the internal zones in order to increase the recording capacity of disc.

FIG. 4 indicates a relationship between cylinder address and the number of sectors per track in the disc memory device formatted by the ZBR method. In this case, 176 sectors, for example, exist in the tracks of the external circumference side and 132 sectors, for example, exist in the internal tracks. Namely, a larger number of sectors exist in the tracks in the external circumference side than the tracks in the internal circumference side.

Since the rotating velocity is always constant in the disc memory device of the ZBR system, although the number of sectors of the internal circumference is less than that of the external circumference, here rises a problem that a longer time is taken to read the data stored in the internal circumference side even when the data size is equal. This problem is also adopted to the disc array apparatus utilizing the disc memory device of the ZBR system. Namely, since the time required for data reading is different depending on the storing location of the sub-blocks generated by dividing the data, the time in which the disc array apparatus can transmit the data is also determined depending on such storing location. In the same manner, the data writing time is also different depending on the storing location.

FIG. 5 shows a profile in which data is dispersed to each disc memory device when the data is stored by the RAID-3 method. In this example, the fixed length data and error correction data are written to gradually fill the disc from the outer most circumference. In this case, since the sub-block forming the first data and the error correction data are stored in the outer most circumference, the shortest reading or writing time is required. On the contrary, since the sub-block forming the last data and error correction data are stored in the inner most circumference, the longest reading or writing time is required. As explained above, such tendency for changing the access time depending on the storing location is particularly not preferable for application in the multimedia field where assurance for the real-time property is required.

Moreover, as shown in FIG. 6, in the server utilizing a disc memory device of the ZBR system, it is thought that the sub-blocks for storing data are classified into those for storing data from the external circumference of disc and those for storing data from the internal circumference of disc in order to make constant the times required for reading and writing of data and thereby the data size is determined in such a way to make constant the data reading time and data writing time.

On the occasion of deciding a size of each sub-block, it is determined so that it is proportional to the number of sectors per track storing the data. In this case, the size of each sub-block is not equal. On the other hand, in the error correction data generating method in the related art system including the RAID-1 system to RAID-5 system, there has been a condition that the sub-blocks are all given the equal size. Therefore, it has been impossible in the related system that the error correction data cannot be generated for the sub-blocks in different sizes.

SUMMARY OF THE INVENTION

Considering such background explained above, the present invention has been proposed and it is therefore an object of the present invention to provide a disc array apparatus which can make constant the data reading time and data writing time and moreover is capable of adding an error correction data to each data in view of enhancing the reliability of data.

There is provided a constitution of disc array control method for controlling access to a disc device consisting of a plurality of second data obtained by a first data and a plurality discs storing an error correction data for the second data. The method explained above is comprising the steps of determining the information, for the disc drive, consisting of a disc storing each second data and address on the disc, data size of a plurality of second data, disc storing error correction data and address on the disc for making constant the access time to a plurality of second data and the error correction data and executing access to the disc drive on the basis of the information determined above.

The second data is formed of a plurality of third data. When the number of second data forming the first data is defined as n and the j-th third data among a plurality of third data forming the i-th second data is defined as Aij, the error correction data is generated on the basis of Aij selected from different second data less than n data.

Moreover, the present invention has a structure of the disc array apparatus for controlling access to a disc drive consisting of a plurality of discs storing a plurality of second data obtained by dividing the first data and error correction data for the second data. The structure explained above comprises a plurality of discs, a unit for determining, for a plurality of discs, the information consisting of disc drive for storing a plurality of second data and address of disc drive on the disc, data size of a plurality of second data, a disc drive for storing the error correction data and address of the disc drive on the disc and a unit for executing access to the disc drive on the basis of the information determined above.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 5 is a diagram for showing a related art for distributing data by making constant the size of sub-blocks;

FIG. 6 is a diagram showing a profile of distribution of sub-blocks;

FIG. 7 is a block diagram showing a structure of an embodiment of the multi-media server to which the disc array apparatus of the present invention is applied;

FIGS. 8A and 8B are diagrams showing an example of a block map 3 of FIG. 7;

FIG. 11 is a diagram showing each sub-block consisting of a plurality of packets and error correction data;

FIGS. 12A, 12B are diagrams showing a method of recovering error data;

FIGS. 14A, 14B are diagrams showing relationship between logical sector addresses and physical sector addresses;

FIG. 15 is a diagram showing allocation where skew and gap are set constant;

DETAILED DESCRIPTION OF THE PREFERRED EMBODIMENTS

A block allocator 1 generates a block map 3 described later on the basis of the input format parameter and data from ZBR (Zone Bit Recording) table 8 (see FIG. 7). The format parameter is constituted of a size S of one block of data, data division number n and optimum skew value ($\theta_{skew}$).

Figure 1:
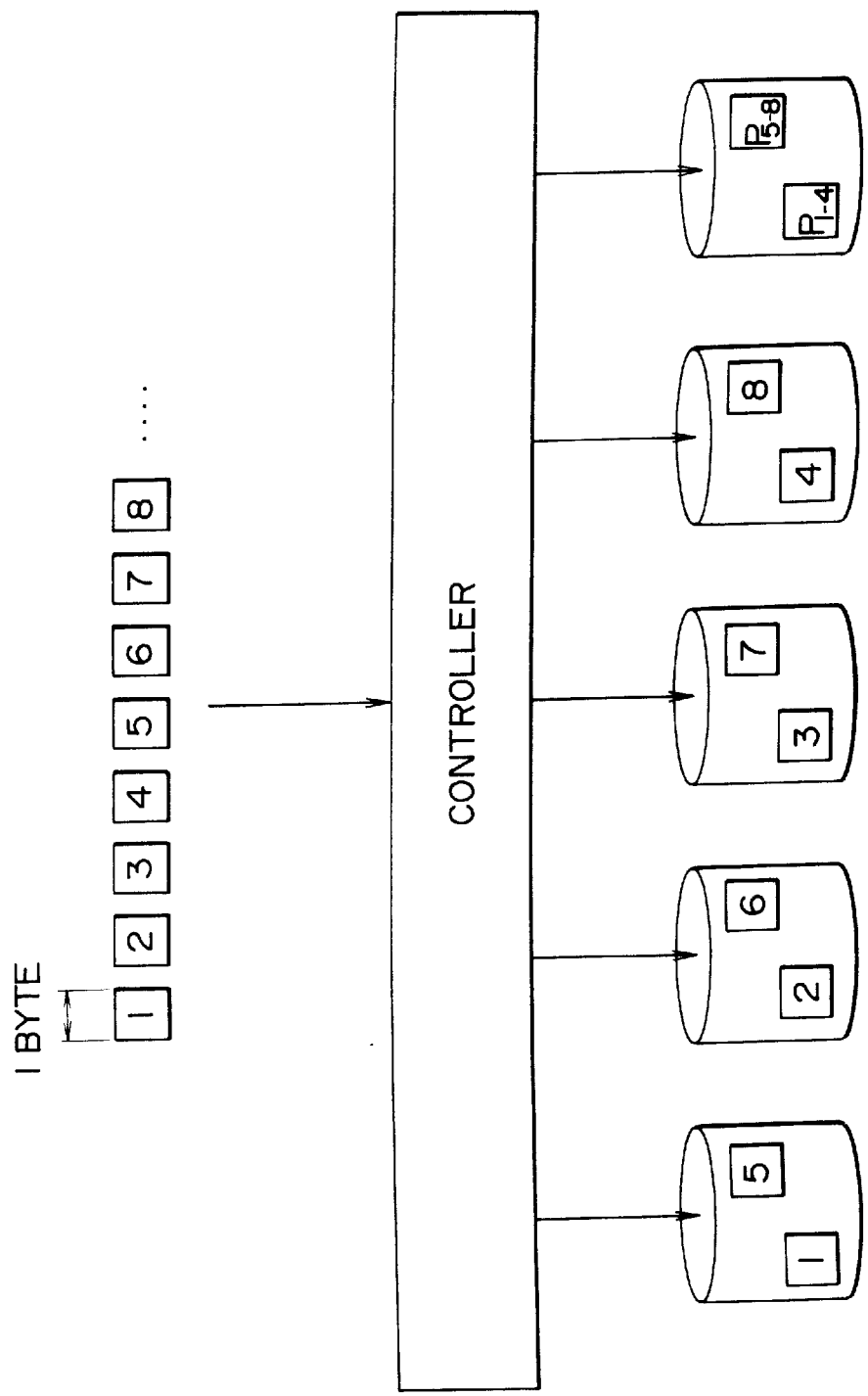
FIG. 1 is a diagram for explaining the RAID-3 system.
Figure 2:
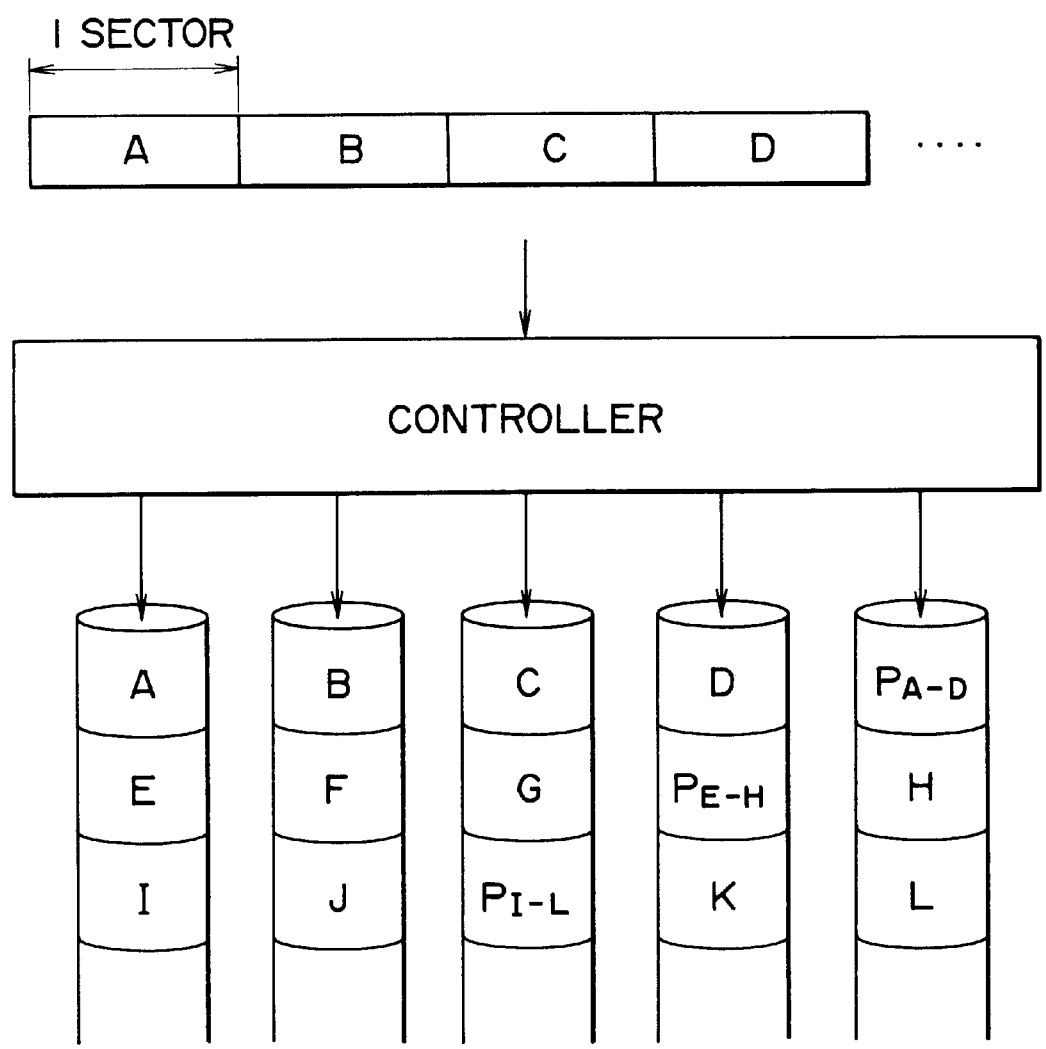
FIG. 2 is a diagram for explaining the RAID-3 system.
Figure 3:
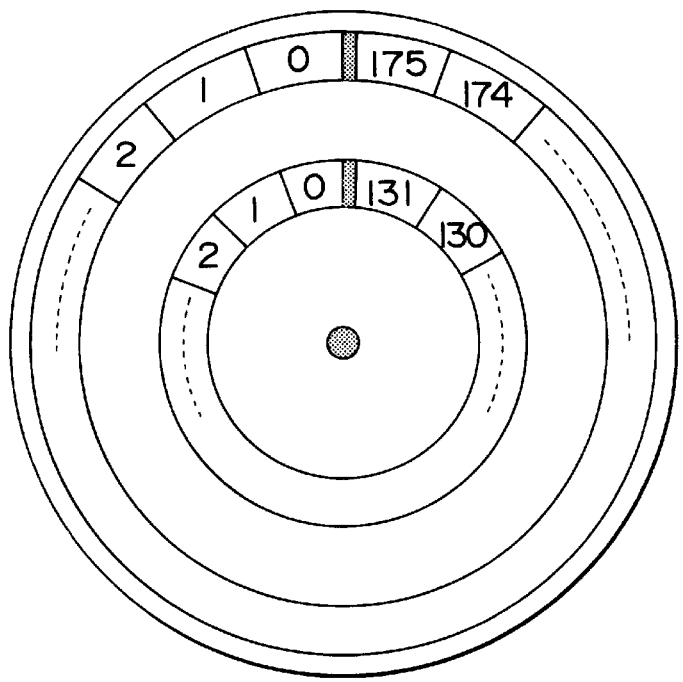
FIG. 3 is a diagram for explaining physical sectors of a ZBR disc.
Figure 4:
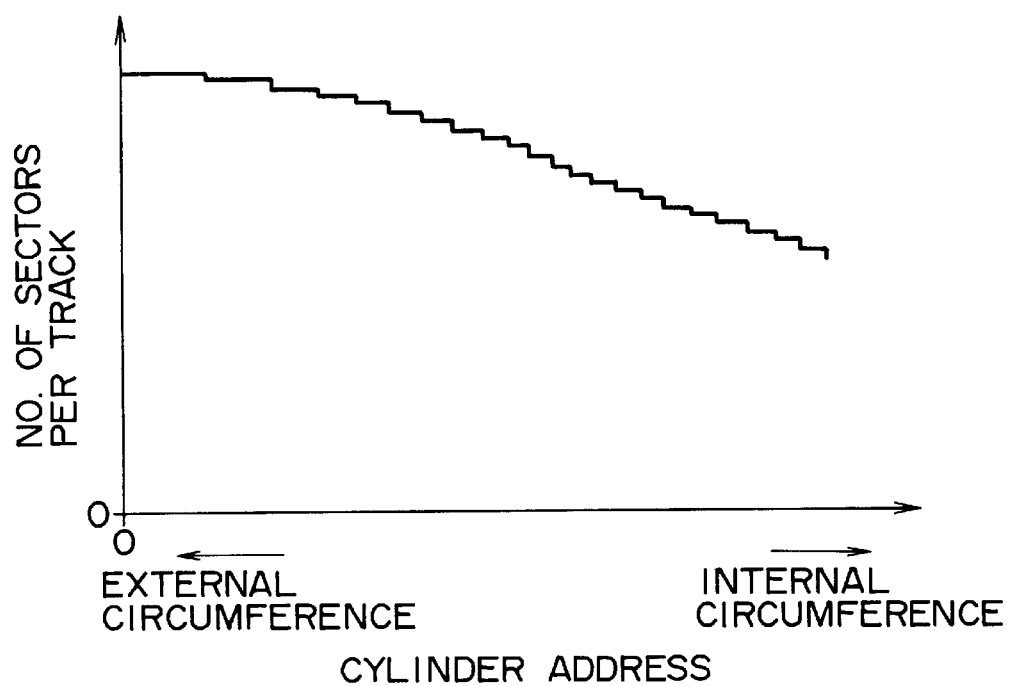
FIG. 4 is a graph showing relationship between the number of sectors per track of the ZBR disc and address.

Meanwhile, the ZBR table 8 determines correspondence between location of data and the number of sectors per track in the same location. It is also indicated by the graph of FIG. 4. Therefore, the number of sectors per track may be checked from the location of data. Moreover, the processing for converting the physical sector address of the disc memory devices 6-1 to 6-m to the logical sector addresses may be required, but in this embodiment, such conversion is executed by making inquiry in direct to the disc memory devices 6-1 to 6-m via the SCSI (ANSI Small Computer System Interface) drivers 5-1 to 5-m described later. When not required particularly, the SCSI drivers 5-1 to 5-m are described only as SCSI driver 5 and the disc memory devices 6-1 to 6-m are described only as disc memory device 6 in the following explanation.

Relationship between the logical sector address and physical sector address of the disc memory device 6 will be explained later with reference to FIGS. 14A and 14B.

An error correction controller (ECC Controller) 9 reads data from the data buffer 4, generates an error correction data, supplies this error correction data to a data buffer 4 and corrects, if there is an error in the sub-blocks forming the data read from the data buffer 4, such sub-blocks using the error correction data forming the same data.

The block allocator 1 generates a block map 3 after determination of the data allocation. The block map 3 shows, as shown in FIGS. 8A and 8B, where n sub-blocks obtained by dividing the k-th data (where k is a desired natural number not exceeding the total number of data) and error correction data should be stored on the disc. At the upper most stage of each data, the error correction data is allocated and this location can be determined depending on the disc memory device number $D_{kp}$, starting logical sector address $L_{kp}$ on the disc memory device and the number of sectors $S_{kp}$ which constitutes sub-blocks. Moreover, the location of sub-block can be determined depending on the disc memory device number $D_{ki}$, starting logical sector address $L_{ki}$ on the disc memory device and the number of sectors $S_{ki}$ which constitutes sub-blocks. Here, i is a natural number of $1 \leq i \leq n$.

When data is read or written continuously, a plurality of requests for access to data are generated and the data number as the information to identify these requests, address on the data buffer 4 where the data is allocated and a flag indicating the read or write operation is accumulated in an access request buffer 7.

A scheduler 2 reads a plurality of information from the access request buffer 7 within a predetermined time and checks the locations of the sub-blocks constituting the data requested and error correction data with reference to the block map 3. The location data is formed of the disc memory device 6, starting logical sector address on the disc memory device 6 and the number of sectors, and the scheduler 2 issues the access request to the SCSI driver 5 to drive the relevant disc memory device 6.

The data buffer 4 temporarily stores the input multi-media data or temporarily stores the multi-media data read from the disc memory device 6.

Figure 9A:
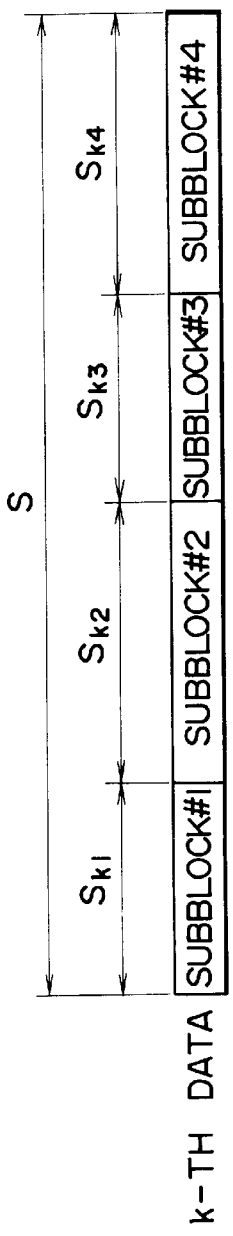
FIGS. 9A, 9B, 9C are diagrams showing a method of generating an error correction data.
Figure 9B:
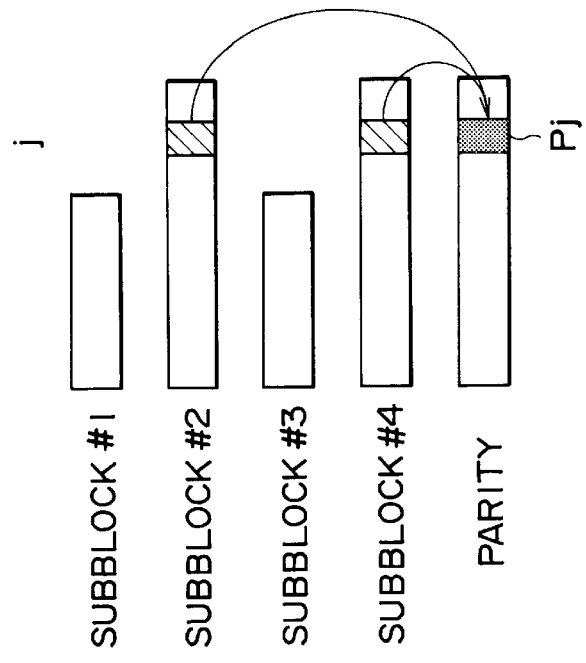
Figure 9C:
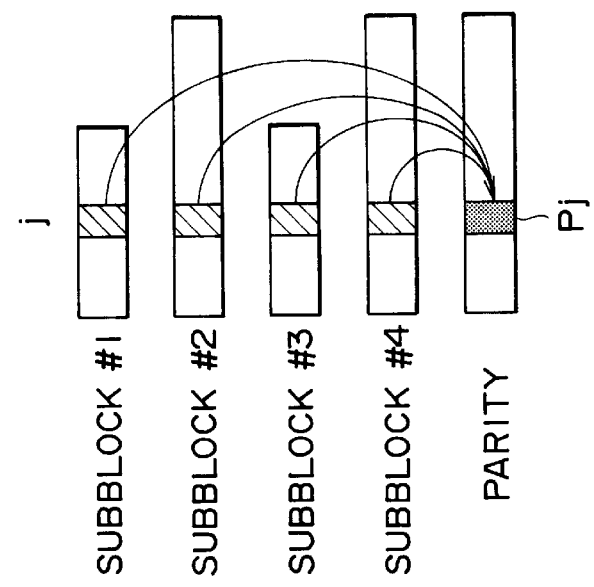

Next, operation of each section for writing data to the disc memory device 6 will be explained. First, the data to be written into the disc memory device 6 is sequentially written into the data buffer 4. In this case, the scheduler 2 has an information about how to divide the data from the block map 3. FIGS. 9A, 9B and 9C shows an example of dividing the k-th data to the sub-blocks of different sizes. Namely, the data of size S is divided into the sub-block #1 of size $S_{k1}$, the sub-block #2 of size $S_{k2}$, the sub-block #3 of size $S_{k3}$ and the sub-block #4 of size $S_{k4}$.

Figure 10:
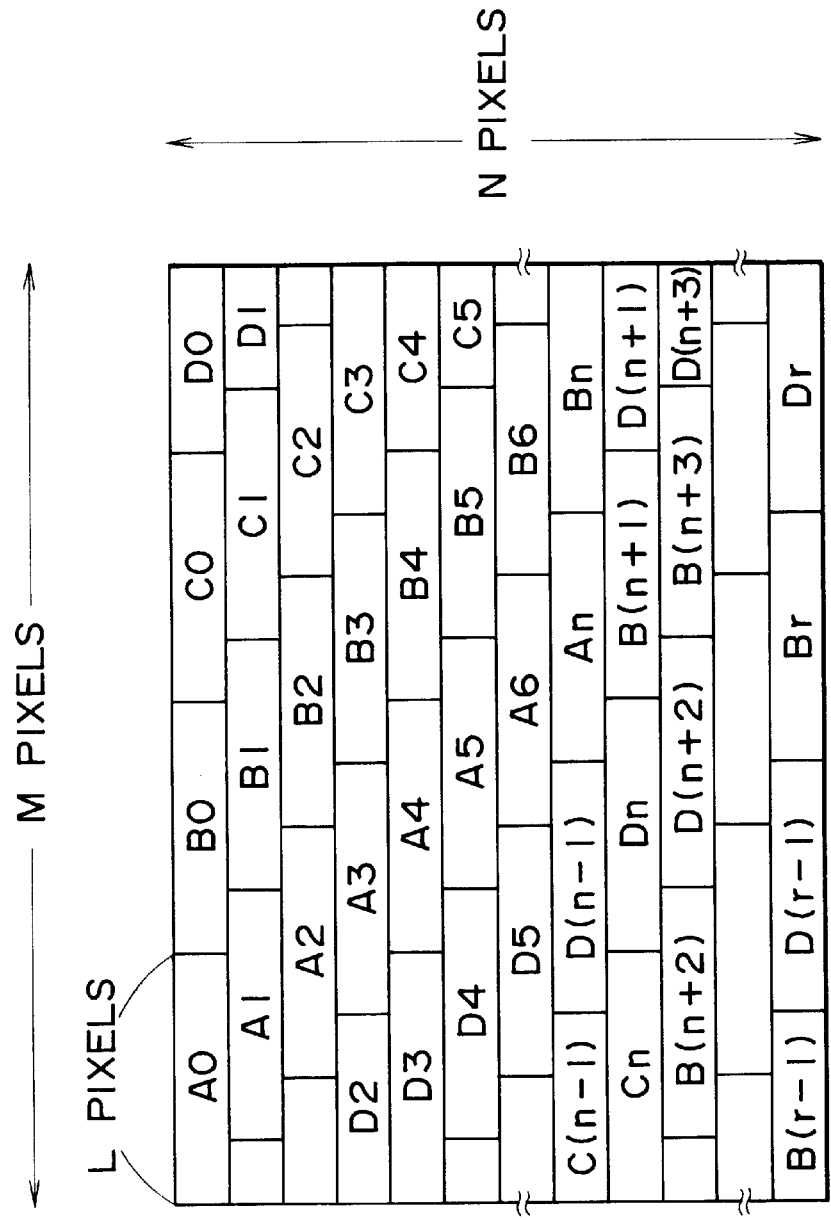
FIG. 10 is a diagram showing division of data of one frame into a plurality of packets.

Here, division to sub-blocks will be explained in further in detail. For example, if the data of size S is assumed as the data of one frame, the data of one frame is divided into the sub-blocks #1, #2, #3, #4 of the sizes $S_{k1}$, $S_{k2}$, $S_{k3}$ and $S_{k4}$. As shown in FIG. 10, when the data of one frame is formed of M×N pixels, one frame is divided to the packets consisting of the predetermined number of pixels (L pixels). Moreover, also as shown in FIG. 10, each divided packet is assigned sequentially to four sub-blocks. For example, the packet A0 is assigned to the sub-block #1, the packet B0 to the sub-block #2, the packet C0 to the sub-block #3 and the packet D4 to the sub-block #4, the packet A1 to the sub-block #1, the packet B1 to the sub-block #2, the packet C1 to the sub-block #3 and the packet D4 to the sub-block #4. As explained, the data can be divided to the sub-block #1, sub-block #2, sub-block #3 and sub-block #4 as shown in FIG. 11 by sequentially assigning each packet to each sub-block.

An error correction controller 9 reads these sub-blocks from the data buffer 4 depending on the instruction from the scheduler 2 and generates the error correction data depending on the sub-block having been read. Size of the sub-block is generally not constant and size of the error correction data is set equal to the largest size of the sub-block among those having been divided.

Basically, the j-th error correction data $P_j$ is generated from the j-th data of each sub-block. In this case, as shown in FIG. 9, since the j-th data corresponding to all sub-blocks exists when a value of j is rather small, the error correction data $P_j$ is generated from the data of all sub-blocks. On the other hand, when j becomes larger to a certain degree, as shown in FIG. 9, the j-th data does not exist in some sub-blocks. In this case, the j-th data does not exist in the sub-blocks #1 and #3.

In such a case, the j-th data is read from the sub-blocks #2 and #4 having the size larger than j and the error correction data $P_j$ is generated based on these data. Or, the predetermined data is added to the sub-blocks #1, #3 and as in the case of FIG. 9, the error correction data $P_j$ can be generated from the data of all sub-blocks. Although various algorithms are provided for generation of the error correction data, detail explanation for these algorithms will be eliminated here to simplify the explanation. FIG. 11 shows the parity generated from each sub-block formed of the packets.

The error correction data generated from the error correction controller 9 is written into the data buffer 4. Thereafter, the SCSI driver 5 having received an instruction from the scheduler 2 writes the sub-block and error correction data on the data buffer 4 to the relevant disc memory device 6 to complete a series of writing operations.

Next, operation of each element for reading the data will then be explained. First, an access request is stored in the access request buffer 7. The scheduler 2 reads the access request from the access request buffer 7 and supplies it to the SCSI driver 5. The SCSI driver 5 reads, depending on the access request supplied from the scheduler 2, the sub-block and error correction data designated by the access request from the relevant disc memory device 6 and then writes these data into the data buffer 4.

The error correction controller 9 reads these sub-blocks and error correction data written into the data buffer 4 in accordance with the instruction from the scheduler 2 and judges whether there is an error or not in the sub-block depending on the error correction data and corrects an error if there is an error.

For example, when the j-th data of the predetermined sub-block has an error, the error is basically corrected using the j-th data of the other sub-block and the error correction data. For example, as shown in FIG. 12A, if a value of j is small, since the error correction data is generated from the j-th data of all sub-blocks, the j-th data of the sub-block #4 is corrected using the j-th data of the error correction data and all j-th data of the sub-blocks #1 to #3.

On the other hand, as shown in FIG. 12B, when a value of j becomes larger to a certain degree, since the error correction data is generated from the j-th data of the sub-blocks of the size larger than j, correction is made using the error correction data under the assumption that there is no error in the sub-blocks of the size larger than j. The sub-blocks of which errors are corrected are written into the designated location on the data buffer 4 and this corrected data is transmitted to the external elements of the disc array apparatus as the correct data.

Figure 13A:
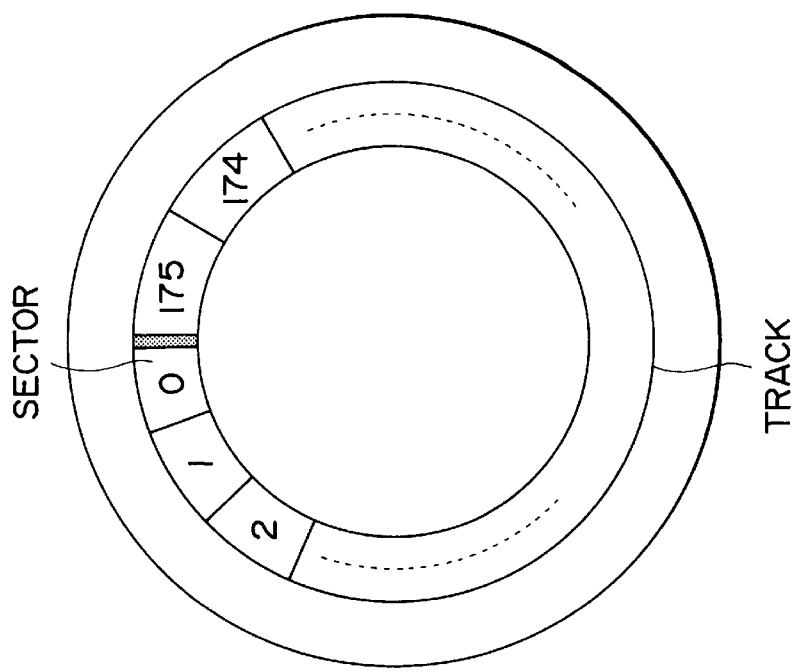
FIGS. 13A, 13B are diagrams showing physical sectors of a disc memory device 6.
Figure 13B:
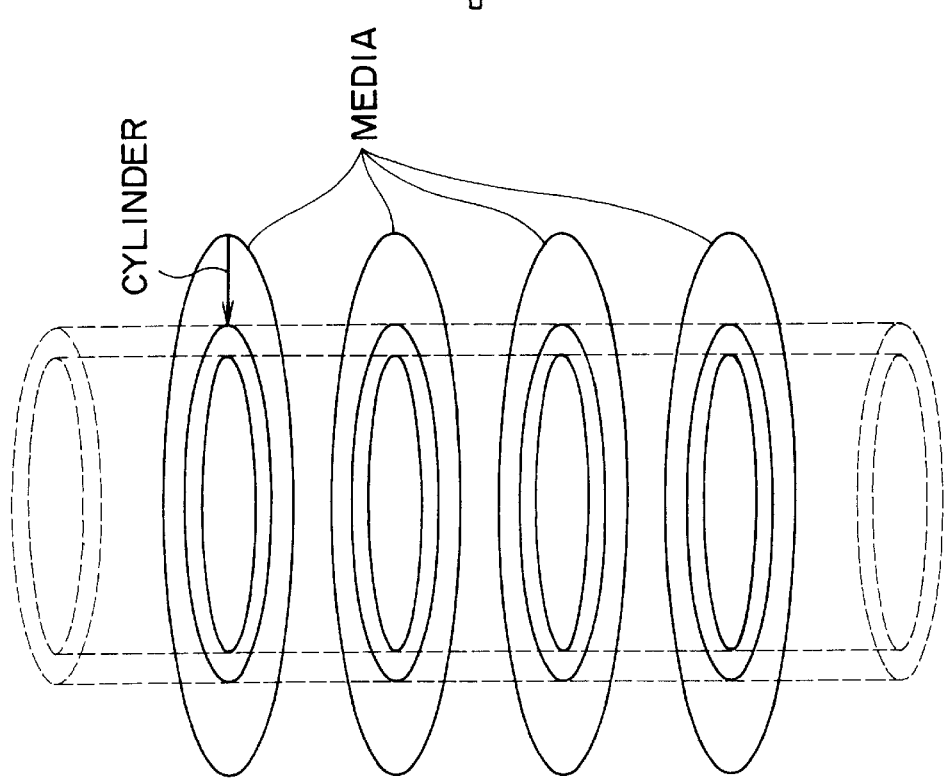

Here, relationship between the logical sector address and physical sector address of the disc memory device 6 will be explained. As shown in FIG. 13B, the disc memory device 6 is usually designed to be capable of making access to each region called sector. The sector generally has a size of 512 bytes to 4 Kbytes. A doughnut type region formed by arranging the section on the circumference is called a track and a cylindrical region formed by collecting the tracks on the same distance from the center of the recording media stacked in a plurality of sheets as shown in FIG. 13A is called a cylinder. As explained above, the address consisting of cylinder number, media number and sector number is a physical sector address.

Meanwhile, in recent years, a serial number is given to all sectors in the drive conforming to the SCSI specification which is now most popular in this field and access is made to data using such serial number. This serial number is the logical sector address. As explained above, the block allocator 1 realizes conversion between the physical sector address and logical sector address by issuing in direct the inquiry to the disc memory device 6 via the SCSI driver 5. Of course, it is also possible to execute the conversion between the physical sector address and logical sector address by using a correspondence table between the physical sector address and logical sector address as shown in FIGS. 14A and 14B with the other method.

As shown in FIG. 14A, the logical sector address $L_{ki}$ is caused to correspond to the physical sector address formed of the cylinder number $CYL_{ki}$, media number $MED_{ki}$ and sector number $SEC_{ki}$. FIG. 14B shows a practical example. Therefore, depending on this correspondence table, the logical sector address can be converted to physical sector address or the physical sector address can be converted to logical sector address.

FIG. 15 shows an example of the allocation in which the skew $\theta_{skew}$ which is an angular difference of starting positions of adjacent sub-blocks on the disc drive and the gap $\theta_{gap}$ which is an angular difference between the ending position and starting position of a sub-block are set to a constant value. Optimization of such allocation will control the waiting time for rotation through combination with the SCAN algorithm for replacing the sequence of disc access request to reduce the movement of head. Details are described in the Japanese Patent Application HEI 7-282175 and the related U.S. Pat. No. 5,708,632. This allocation is only introduced for helping understanding of the embodiment explained above and the present invention can sufficiently be adopted to the allocation not using skew and gap.

Next, with reference to the flowcharts of FIG. 16 to FIG. 21, the processing sequence of allocating the k-th data to the predetermined disc memory device with the block allocator 1 of FIG. 7 will be explained.

First, in the step S1, the n+1 disc memory devices 6 storing error correction data and n sub-blocks are selected from m disc memory devices 6. In this example, the disc drive storing the error correction data is first selected and next the disc drive allocating the sub-blocks from the internal circumference and the disc drive allocating the sub-blocks from the external circumference are selected.

When each sub-block is given the numbers from 1 to n, the sub-blocks of odd numbers, for example, are allocated from the internal circumference side, while the sub-blocks of even numbers are allocated from the external circumference side. Moreover, the disc memory devices 6 to be allocated will be selected with deviation depending on the data so that the sub-blocks are never allocated in concentration to the small number of disc memory devices 6.

Figure 17:
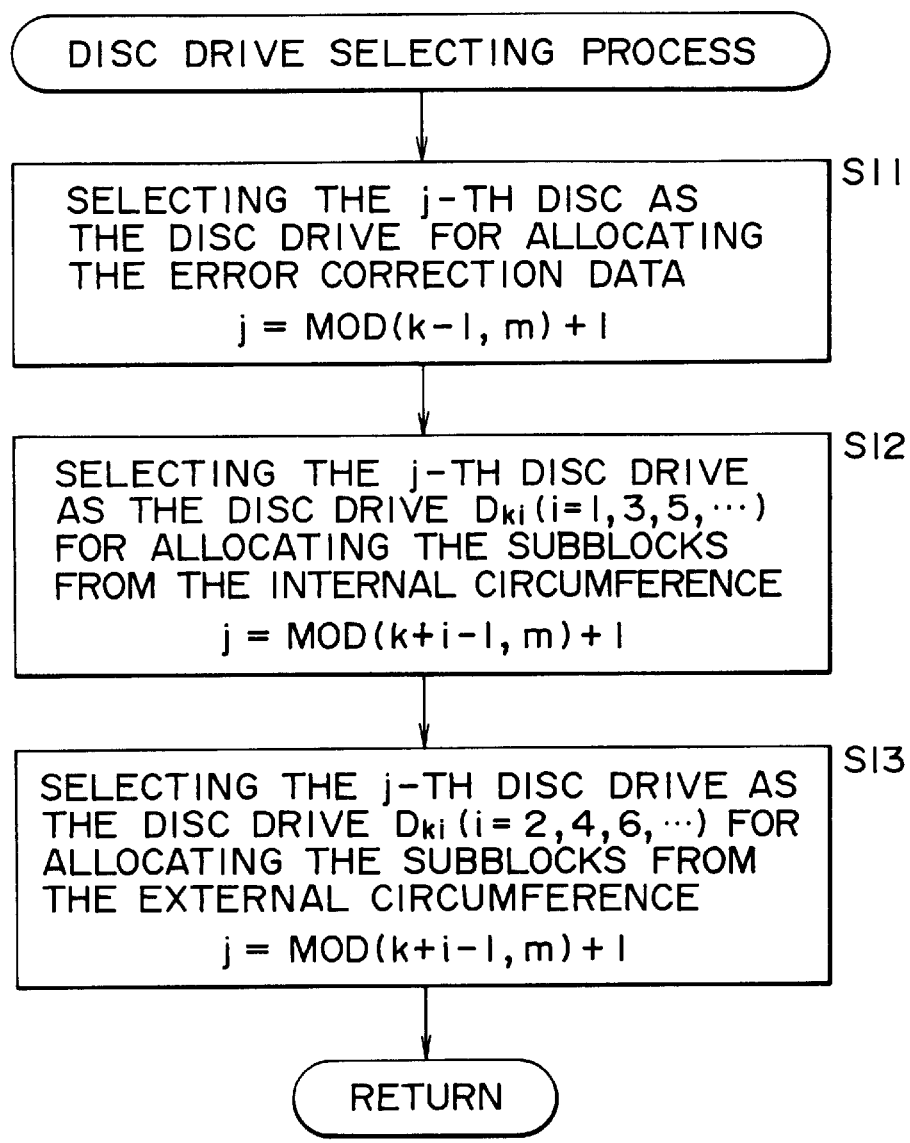
FIG. 17 is a flowchart for explaining the processing sequence to select a disc memory device 6.

FIG. 17 is a flowchart showing the details of the process. Namely, in the step S11, the j-th disc memory device 6 expressed by the following formula (1) is selected as the disc memory device 6 for allocating the error correction data.

$$j=\text{MOD}\ (k-1, m)+1 \tag{1}$$

Here, MOD is an operator for calculating a remainder when k−1 is divided by m (total number of disc memory device 6).

Next in the step S12, the j-th disc memory device 6-i expressed by the formula (2) is selected as the disc memory devices 6-i (i=1, 3, 5, . . . ) allocating the sub-blocks from the internal circumference side.

$$j=\text{MOD}\ (k+i-1, m)+1 \tag{2}$$

Next, in the step S13, the j-th disc memory device 6-i expressed by the formula (2) is selected as the disc memory device 6-i (i=2, 4, 6, . . . ) allocating the sub-blocks from the external circumference side.

In the flowchart of FIG. 17, the sub-blocks allocated from the internal circumference and the sub-blocks allocated from the external circumference are alternately determined but when balance is obtained, these are not always allocated alternately. Namely, it is also possible that the sub-blocks are sequentially allocated in the disc memory device 6 from the internal circumference and thereafter the remaining sub-blocks are sequentially allocated in the disc memory device 6 from the external circumference.

Moreover, when the sub-blocks are not concentrated in a small number of disc memory devices 6, it is enough that the j-th disc memory device 6 expressed by the formulae (1) and (2) is not required to be selected. For example, it is also effective for the disc memory device 6 allocating the sub-blocks from the internal circumference to select the device from the disc memory device 6 not using the internal circumference to a large extent and for the disc memory device 6 allocating the sub-blocks from the external circumference to select the device from the disc memory device 6 not using the external circumference to a large extent. In any case, the error correction data is allocated from the external circumference side on the disc memory device 6 selected in the step S11.

Figure 16:
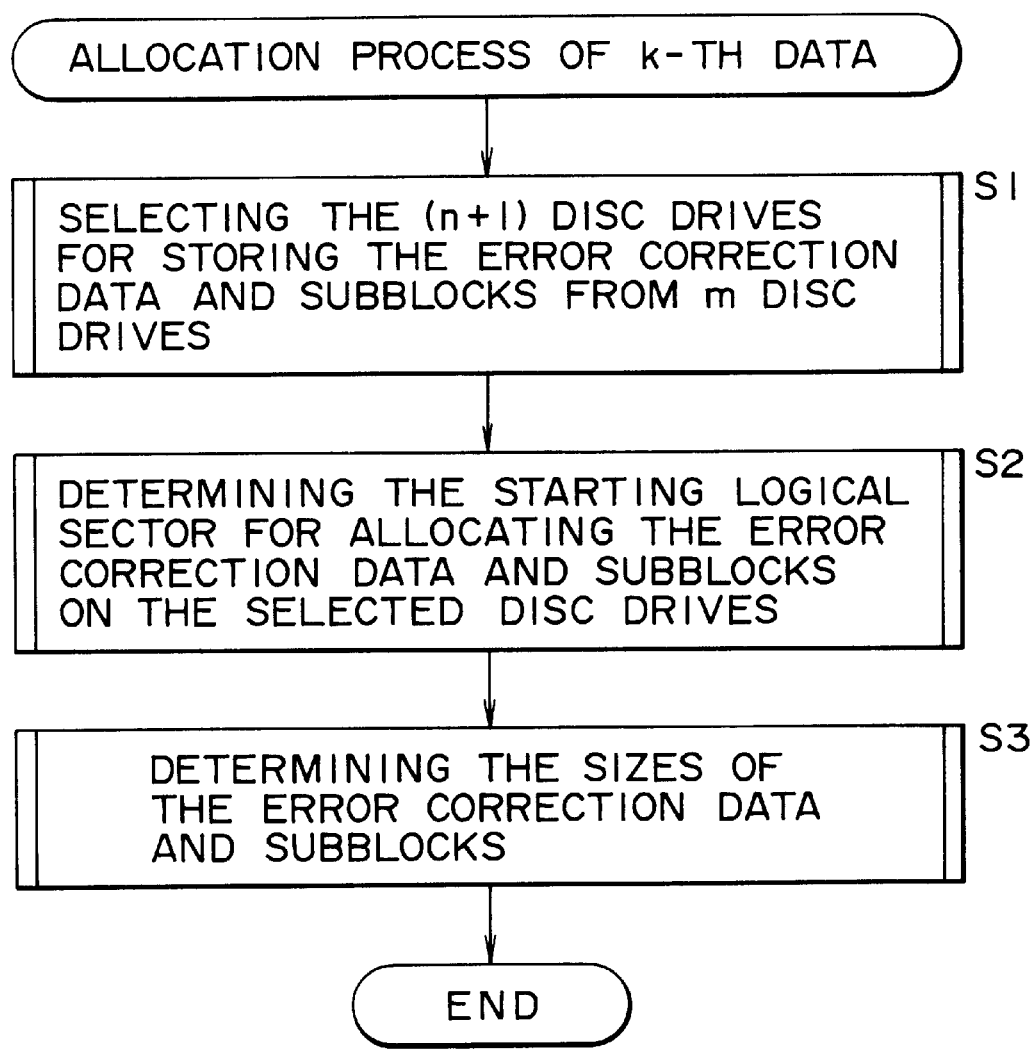
FIG. 16 is a flowchart for explaining the processing sequence to determine the allocation of the k-th data.

As explained above, when the disc memory device 6 is determined, the operation sequence goes to the step S2 of FIG. 16.

In the step S2, the starting logic sector for allocating the error correction data and sub-blocks is determined on the selected each disc memory device 6.

Figure 18:
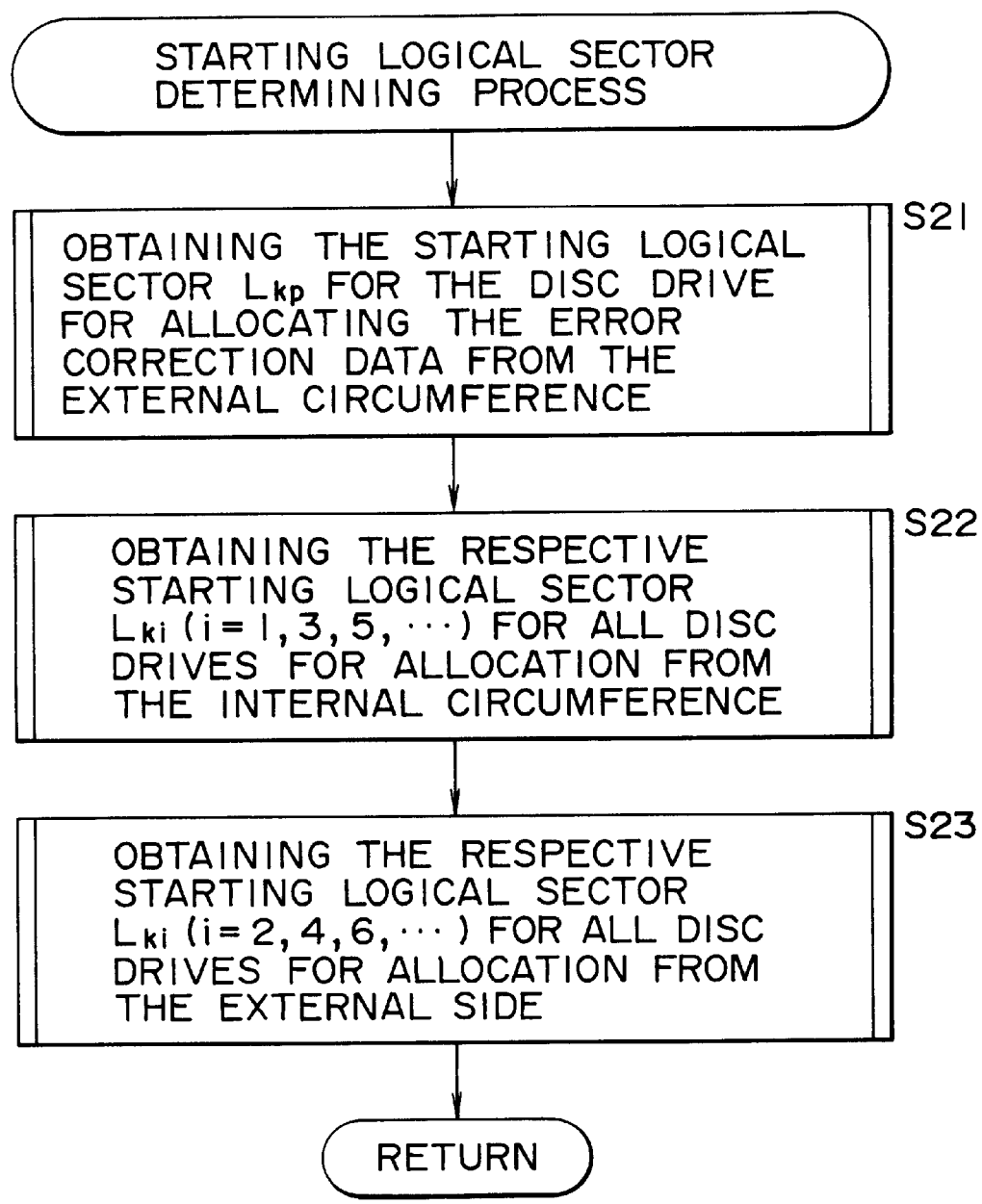
FIG. 18 is a flowchart for explaining the processing sequence to determine the starting logical sector.

FIG. 18 is the flowchart showing the processing sequence for determining the starting logical sector. First, in the step S21, the starting logical sector address $L_{kp}$ is obtained for the disc memory device 6 allocating the error correction data from the external circumference side.

Figure 19:
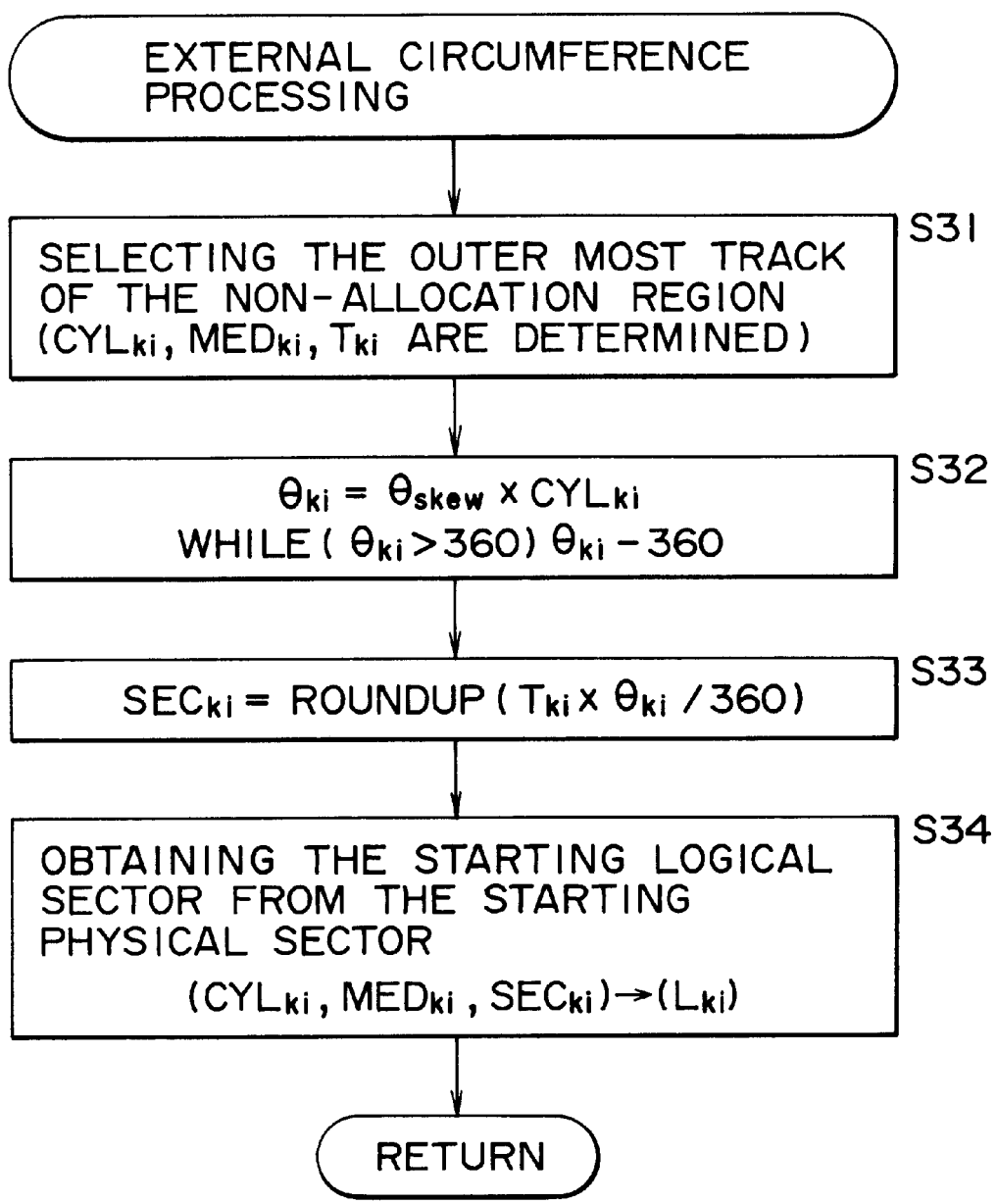
FIG. 19 is a flowchart for explaining the processing sequence to determine the starting logical sector from the external circumference.

FIG. 19 is the flowchart showing details of the processing in the step S21 of FIG. 18. First, in the step S31, the most outer track is selected from the nonallocating region where the sub-blocks are not yet allocated as the track for allocating the sub-blocks. Thereby, the cylinder number ($CYL_{ki}$) and the media number ($MED_{ki}$) of the physical sector address are determined and the number of sectors ($T_{ki}$) per track in this allocation can be detected with reference to the ZBR table 8.

Next, in the step S32, an angle $\theta_{ki}$ formed by the leading part of the track selected in the step S31 and the leading part of the outer most track can be obtained depending on the formula (3) from the cylinder number ($CYL_{ki}$) and the value of the optimum skew ($\theta_{skew}$).

$$\theta_{ki}=\theta_{skew}\times CYL_{ki} \quad (3)$$

Where, when $\theta_{ki}>360$, $\theta_{ki}=\theta_{ki}-360$ is repeaetd until <360 can be obtained.

Next, in the step S33, the sector number ($SEC_{ki}$) is obtained by the formula (4) depending on the angle $\theta_{ki}$ obtained in the formula (3) and the number of sectors ($T_{ki}$) per track.

$$SEC_{ki}=T_{ki}\times\theta_{ki}/360 \quad (4)$$

Next, in the step S34, the logical sector address ($L_{ki}$) is determined from the physical sector address ($CYL_{ki}$, $MED_{ki}$, $SEC_{ki}$) obtained in the steps S31 to S33.

Next, in the step S22 of FIG. 18, the starting logical selector address $L_{ki}$ (i=1, 3, 5, . . . ) is obtained for all disc memory devices 6 allocating sub-blocks from the internal circumference side.

Figure 20:
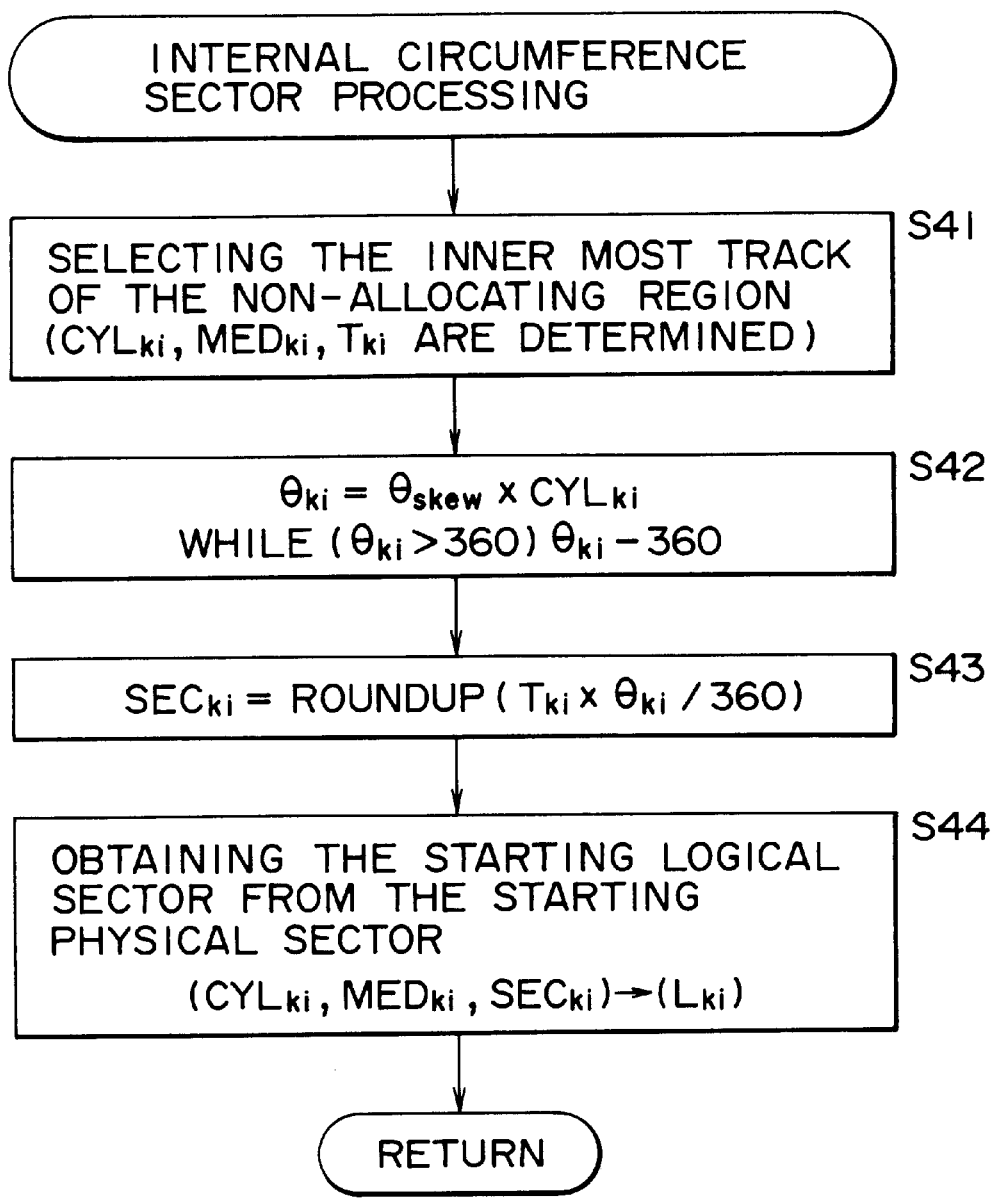
FIG. 20 is a flowchart for explaining the processing sequence to determine the starting logical sector from the internal circumference.

FIG. 20 is a flowchart showing details of the processing in the step S22 of FIG. 18. First, in the step S41, the inner most track is selected from the non-allocation region as the track for allocating sub-blocks. Thereby, the cylinder number ($CYL_{ki}$) and media number ($MED_{ki}$) of the physical sector address are determined and the number of sectors ($T_{ki}$) per track in this allocation can be detected with reference to the ZBR table 8.

Thereafter, in the step S42, an angle $\theta_{ki}$ formed by the leading part of the track selected in the step S41 and the leading part of the outer most track is obtained and the sector number ($SEC_{ki}$) is also obtained in the step S43. In the step S44, the logical sector address ($L_{ki}$) is determined from the physical sector address ($CYL_{ki}$, $MED_{ki}$, $SEC_{ki}$) obtained. Since the processes in the steps S42 to S44 explained above are similar to the processes in the steps S32 to S34 in FIG. 19, detail explanation of such processes is eliminated here.

Next, in the step S23 of FIG. 18, the starting logical sector address $L_{ki}$ (i=1, 3, 5, . . . ) is obtained for all disc memory device 6 allocating sub-blocks from the external circumference side. The processing sequence here is similar to that explained above with reference to the flowchart of FIG. 19. Therefore, the explanation for this processing sequence is eliminated here. The process is completed in this step.

In the processing example shown in FIG. 18 to FIG. 20, in the case of allocating the sub-blocks to the tracks near the external circumference side, the track for allocating sub-blocks is selected from the outer most track in the non-allocating region and in the case of allocating the sub-blocks to the track near the internal circumference side, the track allocating the sub-blocks is selected from the inner most track among the non-allocating region, but it is not always required to select the outer most track or inner most track. For instance, in the format of ZBR system, when the zone is the same, the number of sectors per track is also same and the values of the size of sub-block and gap are not varied.

When the starting logical sector address is obtained as explained above, the size of sub-block is determined in the step S3 of FIG. 16. The processing sequence for determining the size of sub-block will be explained later with reference to the flowchart of FIG. 21.

Next, the size of sub-blocks (number of sectors) will be explained. First, a sum of the sizes of sub-blocks is equal to the size of the original data. Namely, the size (number of sectors) of the sub-block is defined as $S_{ki}$ (i=1, 2, 3, . . . , n) and the size (number of sectors) of original data as S, it is expressed by the following formula (5).

$$S_{k1}+S_{k2}+\ldots+S_{kn}=S \quad (5)$$

Meanwhile, the value of gap of each sub-block must be equal in order to set equal the reading time and writing time of each sub-block. Namely, following formula (6) must be established.

$$S_{k1}/T_{k1}=S_{k2}/T_{k2}=,\ldots,S_{kn}/T_{kn} \quad (6)$$

In above formula (6), $T_{ki}$ (i=1, 2, 3, . . . , n) means the number of sectors of track in which the i-th sub-block is allocated.

Next, from the formulae (5) and (6), the number of sectors $S_{ki}$ of each sub-block is given by the following formula (7).

$$S_{ki}=S\times T_{ki}/T \quad (7)$$

Where, $T=T_{k1}+T_{k2}+,\ldots,+T_{kn}$.

In actual, since the number of sectors $S_{ki}$ is given by an integer, each size requires a little fine adjustment.

Meanwhile, the size $S_{kp}$ of error correction data is given by the following formula (8) when the size of each sub-block is determined.

$$S_{kp}=MAX(S_{k1},S_{k2},\ldots,S_{kn}) \quad (8)$$

In the formula (8), MAX is an operator for obtaining the largest size of sizes $S_{k1}$ to $S_{kn}$ of the sub-blocks.

Since the error correction data is assured to be allocated in the tracks near the external circumference side of the disc memory device 6 from the steps S1 and S2 of FIG. 16, it can be understood that following formula (9) may be established.

$$S_{k1}/T_{k1}=S_{k2}/T_{k2}=,\ldots,=S_{kn}/T_{kn}=S_{kp}/T_{kp} \quad (9)$$

Here, $T_{kp}$ is the number of sectors of track where the sub-blocks $S_{kp}$ is allocated.

Figure 21:
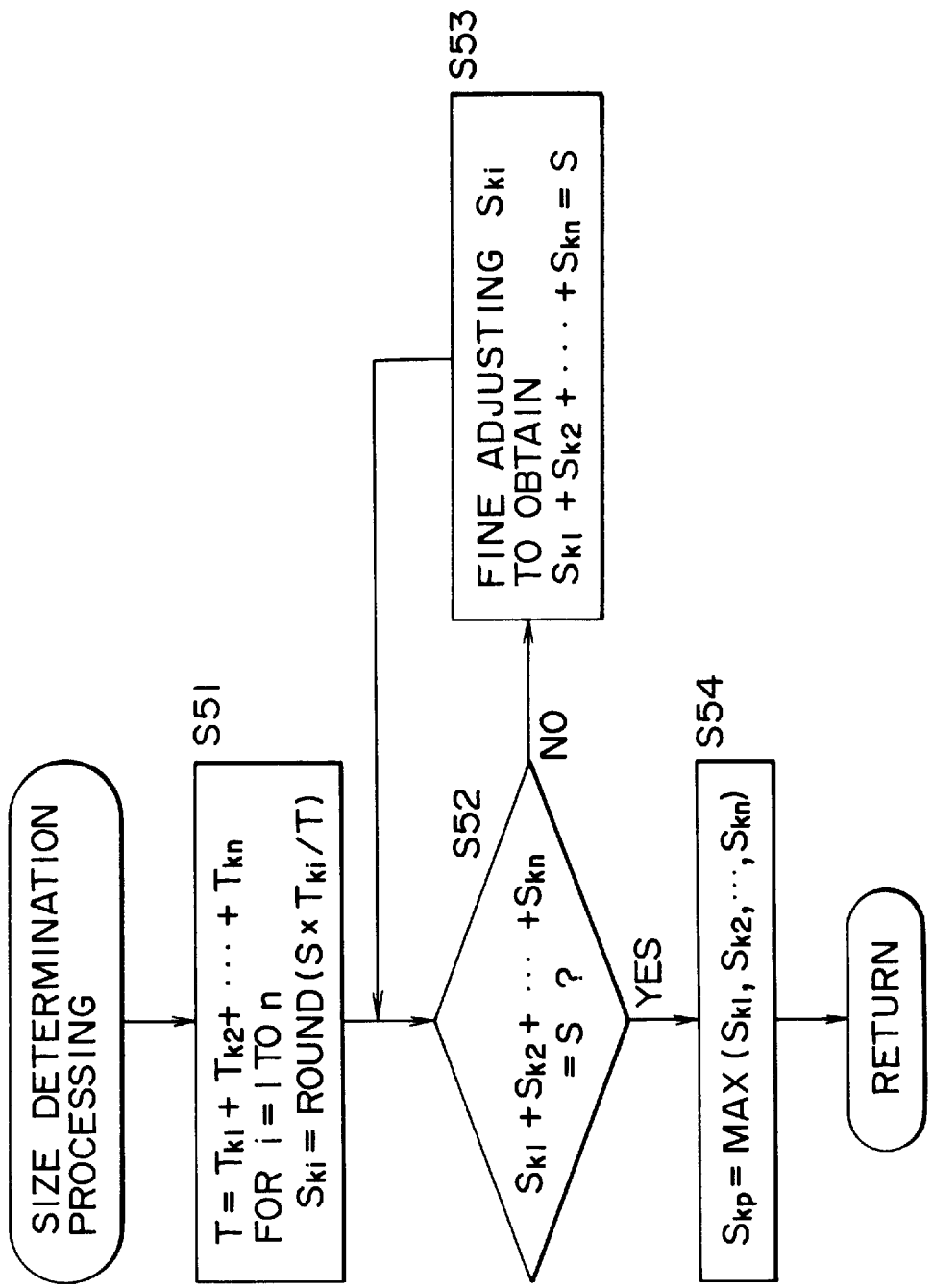
FIG. 21 is a flowchart for explaining the processing sequence to determine the size.

FIG. 21 is a flowchart to realize the sequence explained above. First, in the step S51, a total T of the number of sectors $T_{ki}$ (i=1, 2, . . . , n) per track corresponding to the allocation of n sub-blocks is obtained. Next, the calculation expressed by the formula (7) is executed for the variable i which changes from 1 to n to obtain the size $S_{ki}$ (i=1, 2, . . . , n) of each sub-block.

In the step S52, calculation expressed by the formula (5) is executed to judge whether a total of the size $S_{ki}$ of sub-blocks obtained in the step S51 is equal to the size S of the original data or not. When the total of the sizes $S_{ki}$ of the sub-blocks is judged to be not equal to the size S of the original data, process goes to the step S53. In this step, the size $S_{ki}$ of sub-block is fine adjusted so that the total $S_{ki}$ of the sub-blocks becomes equal to the size S of the original data. Thereafter, returning to the step S52, the processes from the steps S52 and S53 are repeated until the total of the size $S_{ki}$ of sub-blocks is judged to be equal to the size S of the original data.

On the other hand, in the step S52, when the total of the size $S_{ki}$ of sub-blocks is judged to be equal to the size S of the original data, the size $S_{kp}$ of the data for error correction is obtained in the step S54. Namely, the largest size of the sub-block $S_{ki}$ is defined as the size $S_{kp}$ of the data for error correction.

When the process of the step 554 is completed, the process of the step S3 of the flowchart of FIG. 16 is terminated and thereby all processes are completed.

Figure 22:
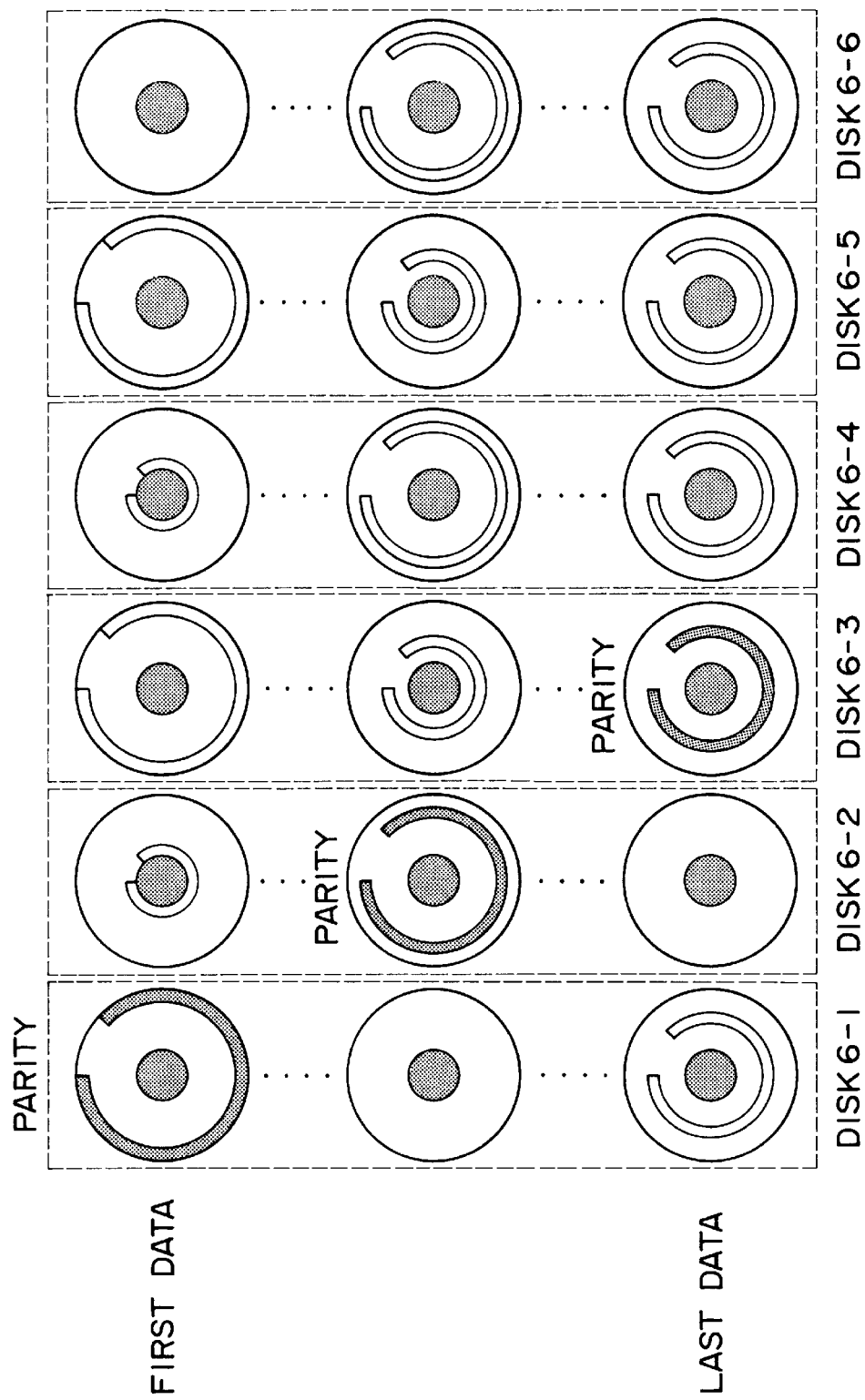
FIG. 22 is a diagram showing a profile of distribution of error correction data and sub-blocks.

FIG. 22 indicates an example of the sub-blocks distributed to the disc memory device 6 as explained above. Here, the number of disc memory devices 6 is set to six and the number of sub-blocks is set to 4. Namely, as shown in FIG. 21, the error correction data is generated by the method explained above for the sub-blocks of different sizes.

The error correction data (parity in this case) of the first data is allocated in the disc memory device 6-1, while the sub-blocks are allocated through distribution to the disc memory devices 6-2 to 6-5. The error correction data allocated to the disc memory device 6-1 and the sub-blocks allocated to the disc memory devices 6-3, 6-5 are located to the outer most track, while the sub-blocks allocated to the disc memory devices 6-2, 6-4 are located to the inner most track.

Moreover, the error correction data of the second data is input to the disc memory device, while the sub-blocks are input thereto in the sequence from the external circumference, from the internal circumference, from the external circumference, from the internal circumference and from the external circumference. Moreover, the error correction data of the third data is input to the disc memory device 6-3, while the sub-blocks are input thereto in the same manner in the sequence from the outer circumference, from the internal circumference, from the external circumference, from the intern al circumference and from the external circumference. In the same manner, the data is allocated as explained hereunder and the final data is allocated, for example, to almost the intermediate area of the cylinders of the disc memory devices 6-3 to 6-6 and disc memory device 6-1.

Here, attention is paid to the error correction data and sub-blocks allocated on one disc memory device 6. The value of gaps of sub-blocks is almost equal and almost constant time is required for reading and writing of each sub-block.

In the embodiment explained above, the time required for actually reading and writing the error correction data and sub-blocks can be set to the constant value without relation to the location of data on the disc memory device 6.

In this embodiment, data reading and writing from/to the disc memory device 6 is controlled using an exclusive controller. However, it is also possible to control the data reading and writing from/to the disc memory device 6 by operating the control software of such controller on the CPU of the host computer.

Moreover, in the above embodiment, scanning is made in the direction from the external circumference to the internal circumference on the occasion of making access to the data, but scanning from the internal circumference to the external circumference is also possible. In this case, the optimum skew may be set for access to data while moving the head from the internal circumference side to the external circumference side.

In addition, in above embodiment, a hard disc is used as a medium for recording data, but the other recording medium such as optical disc and magneto-optical disc can also be used.

According to the disc array control method and disc array control apparatus of the present invention, the time required for making access to the error correction data and sub-blocks can be set to a constant value and the realtime property can be assured while high reliability is maintained.

Although preferred embodiment of the present invention has been described and illustrated, it will be apparent to those skilled in the art that various modification may be made without departing from the principles of the invention.

What is claimed is:

1. A method of controlling access to a disc array comprising a plurality of disc drives each having at least one disc with a constant rotation speed, said method comprising the steps of:

dividing an original data into a plurality of sub-blocks, wherein one of said plurality of sub-blocks has a size different than that of another one of said plurality of sub-blocks;

generating error-correction data based on said plurality of sub-blocks; and writing said plurality of sub-blocks and said error-correction data to said disc array, wherein each of said error-correction data and said plurality of sub-blocks is stored on a corresponding one of said disc drives.

2. The method of claim 1, wherein a size of said error correction data is equal to a size of a largest at least one of said plurality of sub-blocks.

3. The method of claim 2, wherein other of said plurality of sub-blocks having a size other than said largest at least one are padded with an amount of predetermined data to increase the size thereof.

4. The method of claim 2, wherein less than all of said plurality of sub-blocks, including said largest at least one, are used to generate said error correction data.

5. The method of claim 1, wherein:

said step of dividing comprises dividing said original data into a first plurality of sub-blocks each of a first size and a second plurality of sub-blocks each of a second size, wherein said first size is smaller than said second size; and said step of writing comprises writing said first plurality of sub-blocks to an internal circumference of said disc array, and writing said second plurality of sub-blocks and said error-correction data to an external circumference of said disc array.

6. The method of claim 5, wherein said first size divided by a number of sectors of said internal circumference is equal to said second size divided by a number of sectors of said external circumference.

7. An apparatus for controlling access to a disc array, comprising:

plurality of disc drives each having at least one disc with a constant rotation speed;

a scheduler circuit, coupled to said plurality of disc drives, said scheduler circuit configured to divide an original data into a plurality of sub-blocks, wherein one of said plurality of sub-blocks has a size different than that of another one of said plurality of sub-blocks;

an error-correction controller circuit, coupled to said scheduler circuit, said error-correction controller circuit configured to generate error-correction data based on said plurality of sub-blocks; and at least one device driver circuit, coupled to said plurality of disc drives, said scheduler circuit and said error-correction controller circuit, said at least one device driver circuit configured to write said plurality of sub-blocks and said error-correction data to said disc array, wherein each of said error-correction data and said plurality of sub-blocks is stored on a corresponding one of said disc drives.

8. The apparatus of claim 7, wherein a size of said error correction data is equal to a size of a largest at least one of said plurality of sub-blocks.

9. The apparatus of claim 8, wherein other of said plurality of sub-blocks having a size other than said largest at least one are padded with an amount of predetermined data to increase the size thereof.

10. The apparatus of claim 8, wherein less than all of said plurality of sub-blocks, including said largest at least one, are used to generate said error correction data.

11. The apparatus of claim 7, wherein:

said scheduler circuit is further configured to divide said original data into a first plurality of sub-blocks each of a first size and a second plurality of sub-blocks each of a second size, wherein said first size is smaller than said second size; and said at least one device driver circuit is further configured to write said first plurality of sub-blocks to an internal circumference of said disc array, and writing said second plurality of sub-blocks and said error-correction data to an external circumference of said disc array.

12. The apparatus of claim 11, wherein said first size divided by a number of sectors of said internal circumference is equal to said second size divided by a number of sectors of said external circumference.

\* \* \* \* \*